United States Patent

[11] 3,577,868

[72] Inventor Hans Muller
Im Allmandli, Erlenbach, Zurich, Switzerland
[21] Appl. No. 874,102
[22] Filed Nov. 5, 1969
[45] Patented May 11, 1971
[32] Priority Nov. 6, 1968
[33] Switzerland
[31] 16660/68

[54] DEVICE FOR SEPARATING FOAM INTO ITS LIQUID AND GASEOUS PHASES
10 Claims, 1 Drawing Fig.

[52] U.S. Cl. .................................................. 55/178, 277/62, 277/74
[51] Int. Cl. .................................................. B01d 19/00
[50] Field of Search .................................................. 55/45, 52, 178, 203, 409; 210/360 (A), 398; 277/61, 62, 74

[56] References Cited
UNITED STATES PATENTS
| | | | |
|---|---|---|---|
| 2,484,971 | 10/1949 | Traylor Jr. ..................... | 277/74X |
| 3,191,545 | 6/1965 | Funk ........................... | 277/74X |
| 3,460,810 | 8/1969 | Mueller ......................... | 259/96 |
| 3,501,414 | 3/1970 | Mueller ......................... | 55/178X |

*Primary Examiner*—Samih N. Zaharna
*Assistant Examiner*—R. W. Burks
*Attorney*—Michael S. Striker

ABSTRACT: A vessel accommodates material to be processed, including foam, and which material is to be protected against contaminants from the exterior of the vessel. A rotatable shaft extends through an opening in the vessel into the latter and carries within the vessel a foam separator which effects foam separation into the liquid and gaseous phases when the shaft is rotated. A drive engages the shaft exteriorly of and spaced from the opening in the vessel for rotating the shaft. Wall means surrounds the shaft intermediate the opening in the vessel and the drive and forms a chamber about the surrounded portion of the shaft. A pair of sliding ring seals are provided on the shaft closing the chamber with respect to the opening in the vessel as well as with respect to the drive. Means is provided for circulating a flowing medium through the chamber to thereby prevent the passage of contaminants from the drive into the chamber and from the latter through the opening into the vessel.

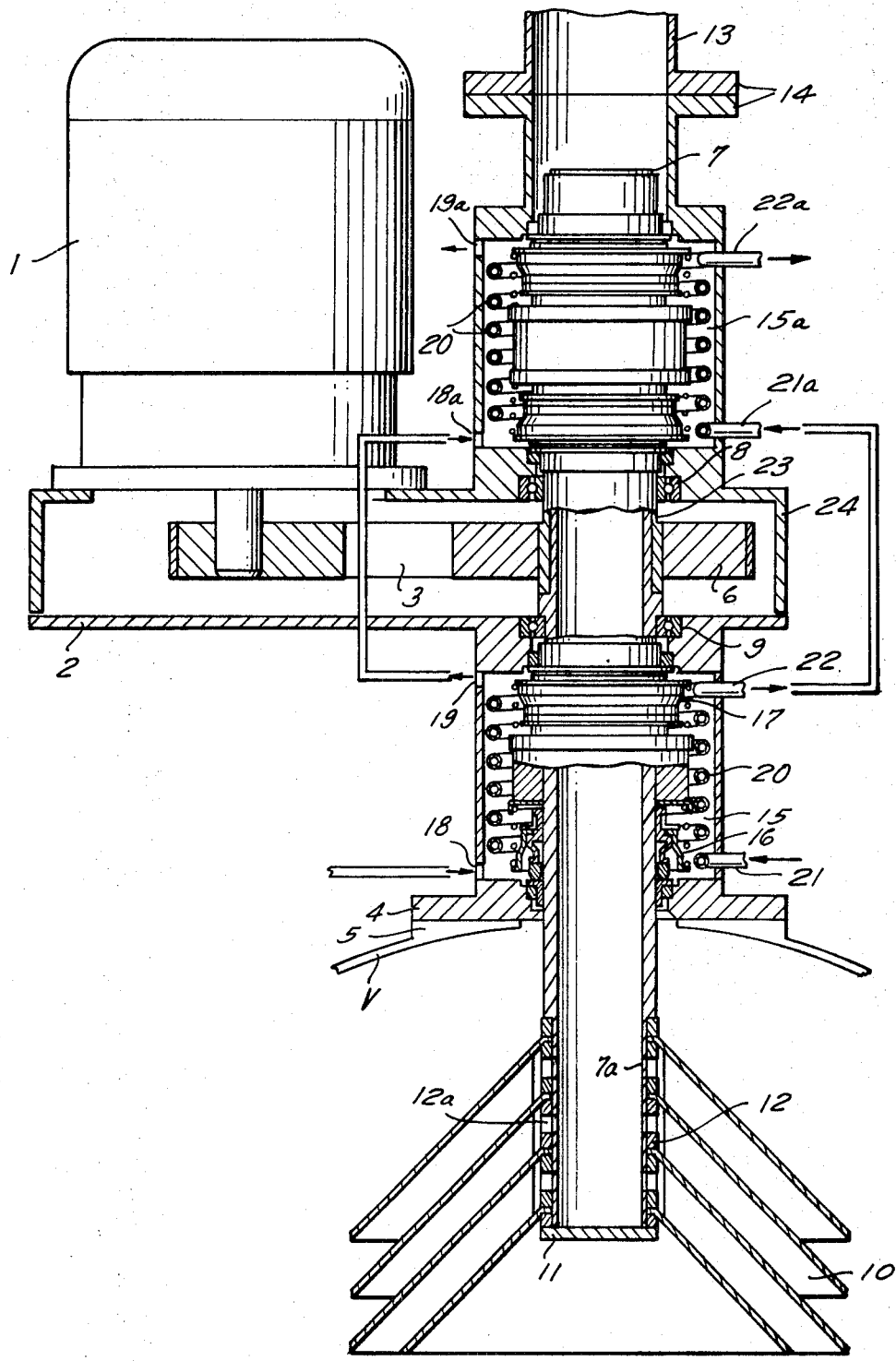

DEVICE FOR SEPARATING FOAM INTO ITS LIQUID AND GASEOUS PHASES

BACKGROUND OF THE INVENTION

The present invention relates generally to a device for separating foam into its gaseous phases, and more particularly to such a device wherein the interior of a vessel is to be prevented against the entry of contaminants from the exterior.

Devices for separating foam into its constituent gaseous and liquid phases are already known. They are utilized in a variety of applications, for instance in conjunction with fermentation vessels wherein the contents tend to form a foam which must then be broken up with a foam breaker to remove the gaseous phase from the interior of the vessel. In devices of this type a rotary shaft, which may be hollow and whose interior may communicate with the interior of the vessel so that the separated gaseous phase may escape through the intermediary of the hollow rotary shaft, extends into the vessel and carries within the latter foam-breaking or foam-breaking foam-separating means. The drive, which may be powered by an electromotor or by another type of motor, acts directly or via gear or belt drives upon the rotary shaft exteriorly of the container or vessel, with the shaft entering either vertically or with slight inclination through the upper portion of the vessel through the wall thereof.

In such constructions it is necessary—because of the nature of the processes which take place within the vessel as well as because of the nature of the materials involved—that the construction be readily sterilizable, that it be possible to maintain it sterile at all times, and that the entry of contaminants into the interior of the vessel—and therefore a contamination of the contents of the vessel—be reliably and under all circumstances prevented. For this reason the use of conventional glands for sealing the vessel where the rotary shaft enters into the same, is impractical. In addition, it has also been found that the use of packing rings does not reliably fulfill the aforementioned requirements. It appears, however, that the so-called sliding ring seals constitute a desirable improvement over the other types of seals just mentioned, except that at elevated rotational speeds of the shaft this type of seal must be well cooled which brings with it the undesirable possibility that contamination of the vessel contents might be brought about by the cooling means utilized. Of course, the same or analogous problems exist in all circumstances where the interior of a vessel must be strictly protected against contamination from drive elements while at the same time all sealing components and drive elements must be readily accessible.

SUMMARY OF THE INVENTION

It is, accordingly, a general object of the present invention to overcome the aforementioned disadvantages.

More particularly it is an object of the present invention to provide a device of the type outlined before wherein all drive and sealing components are readily accessible for maintenance and cleaning purposes, but wherein nevertheless a contamination of the vessel containing the material which is to be acted upon by the drive components, is prevented.

An additional object of the present invention is to provide such a device wherein the construction is very simple and yet highly reliable.

In pursuance of the above objects, and others which will become apparent hereafter, one feature of the invention resides in a device for separating foam into its liquid and gaseous phases which comprises, briefly stated, housing means having an interior which is to be protected against contamination from the exterior, an outer side, and an opening extending from the outer side to the interior. The housing means is adapted to contain foam which is to be separated into its respective phases, but of course the foam will ordinarily be a byproduct and not the primary content of the housing.

A rotatable shaft extends through the opening and includes a first portion located in the interior and a second portion located exteriorly of the housing. The shaft has an inner passage which communicates with the interior of the housing so as to evacuate the gaseous phase of the foam when the latter has been separated into its constituent phases. Drive means engages the outer portion of the shaft spaced from the outer side of the housing for rotating the shaft, and wall means surrounds the outer portion of the shaft and defines a chamber which extends from the drive means to the opening. A pair of sliding ring seal means are provided on the outer portion of the shaft closing the chamber with reference to the opening and with reference to the drive means. Inlet and outlet means communicate with the chamber for permitting the circulation of a flowing medium through the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIG. is a fragmentary somewhat diagrammatic vertical section through an apparatus embodying the present invention.

DESCRIPTION OF THE PREFERRED EMBODIMENTS

Discussing now the drawing in detail it will be seen that reference character V identifies a fragmentarily illustrated vessel, such as a fermentation vessel or the like, which includes certain matter to be protected against contamination from the exterior. In fermentation vessels such matter usually comprises, inter alia, foam which must be separated into its constituent liquid and gaseous phases with the gaseous phase being removed from the interior of the vessel V. For purposes of explanation the invention will hereafter be described on this basis.

A hollow rotatable shaft extends into the interior of the vessel from the exterior and its interior portion is provided with a plurality of apertures 7a communicating with the hollow interior of the shaft 7 as well as with the interior of the vessel V. It carries a plurality of substantially conically configurated separator elements 10 spaced axially by the spacing rings 12, and provided with the apertures 12a communicating with the apertures 7a. Rotation of the shaft 7 and consequently of the elements 10 causes the latter to separate the foam by flinging the foam in the annular gaps between adjacent ones of the separator elements 10 against the inner surface of the separator elements 10 under the influence of centrifugal force, and thereby separating the gaseous and liquid phases, with the gaseous phase escaping through the apertures 7a and 12a to the interior of the shaft 7 and from there to the ambient atmosphere.

The vessel is provided with a flange 5 and a drive is provided comprising a motor 1 of suitable construction and a casing 2 and 24 accommodating the drive 3 which is actuated by the motor 1. The casing, motor 1 and drive 3 are connected via a flange 4 to the flange 5 of the vessel V in suitable manner, for instance by screw threaded means.

In the illustrated embodiment the drive is in form of a belt drive, utilizing a pulley 6 rigidly secured to the hollow shaft 7 and cooperating with the drive 3. The shaft 7 is mounted for rotation by means of antifriction bearings 8 and 9.

Interposed between the pulley 6 and the opening of the vessel V through which the shaft 7 extends into the interior of the latter, is wall means defining a chamber 15 surrounding a portion of the shaft 7 and being closed with respect to the opening of the vessel V as well as with respect to the drive housing 2, 25 by respective slide ring seals 16 and 17. These slide ring seals are in form of ring members mounted on the shaft 7 which engage and slidingly cooperate with sliding surfaces provided on the wall means defining the chamber 15, as illustrated. Such slide ring seals are well known and it is not thought that they require a detailed discussion, either with respect to their construction or with respect to their operation.

Openings 18 and 19 are provided which communicate with the chamber 15 and which respectively serve as an inlet and an outlet for a flowable medium which is to be circulated through the chamber 15. Such a flowable medium is sterilized in order to perform its intended function, namely to prevent the passage of contaminants from the drive through the opening in the vessel V to the interior of the latter. Different materials are suitable for the flowing medium, including steam-sterilized condensate or glycerine which is circulated in a closed path. Regardless of the type of flowing medium involved, however, the purpose of providing this medium and circulating it through the chamber 15 is to prevent contaminants from entering from the drive casing 2, 24 and passing through the opening into the vessel V. At the same time, of course, the flowing medium carries away particles abraded from the sliding ring seals 16, 17 during rotation of the shaft 7.

It is possible to move the flowable medium in a closed path and to bring it into contact with a heat exchanger to thereby cool it and effect in turn cooling of the sliding ring seals 16 and 17 as the flowable medium circulates through the chamber 15. However, it is structurally simpler to provide cooling means within the chamber 15 itself, in the drawing illustrated in form of a helically convoluted conduit 20 having an inlet 21 and an outlet 22 which may be connected to a supply of cooling fluid, such as water. Thus, the cooling fluid is strictly separated in the chamber 15 from the flowable medium, so that it cannot contaminate the latter, but the flowable medium can be cooled and in turn will effect cooling of the sliding ring seals 16, 17.

The inner end of the shaft 7 is provided with a nut 11 which holds the separator elements 10 in place. The outer end, on the other hand, communicates with an outlet conduit 13 which is connected in communication with the hollow interior of the shaft 7. In order to prevent the intrusion of contaminants into the interior of the shaft 7 at the juncture between the same and the outlet conduit 13, additional wall means may be provided defining a chamber 15a which extends from the drive casing 2, 24 to the juncture between the outlet conduit 13 and the open end of the shaft 7. The inlet and outlet openings for the flowable medium to be circulated through the chamber 15 are identified with reference numeral 18a and 19a, respectively, and the inlet and outlet openings for the cooling conduit 20 which is also provided in the chamber 15a are identified with reference numeral 21a and 22a, respectively. In fact, it is advantageous that the outlet opening 22 of the cooling conduit 20 in the chamber 15 be in connection with the inlet opening 21a of the same conduit in the chamber 15a, so that the cooling fluid will serially flow first through the portion of the cooling conduit 20 in the chamber 15 and thereupon through the portion of the cooling conduit 20 in the chamber 15a. Evidently, and as illustrated in the drawing, the same can be done with the flowable medium which is to be circulated through the chambers 15 and 15a, and the drawing shows that the outlet 19 of the chamber 15 can be placed in communication with the inlet 18a of the chamber 15a. The flowable medium in the chamber 15 has a pressure which is in excess of the internal pressure prevailing in the vessel V in order to provide for proper sealing abutment of the abutting portions of the sliding ring seal 16.

The chambers are composed of several components which can be separated readily in order to permit internal cleaning. In order to make the drive components readily accessible without necessitating opening of the chambers 15, 15a, the drive casing 2, 24 and the hollow shaft are both of two-part construction also. The hollow shaft is turnably mounted by means of the antifriction bearing 9 in the lower portion 2 of the drive casing, which is connected with the chamber 15 and the vessel V. The upper chamber and the drive motor 1 are connected with the portion 24 of the drive casing. A hollow sleeve 23 is mounted in the antifriction bearing 8 and at its lower end is connected in motion-transmitting engagement with the inner portion of the shaft 7 when both housing parts are connected with one another, so that rotation of the sleeve 23—which carries the pulley 6—causes rotation of the inner portion of the shaft 7. Thus, the drive housing 2, 24 may be opened for inspection, maintenance, replacement of the belt or the like, without any necessity for opening the chambers 5, 15 which are to be maintained in sterile condition.

The outlet conduit 13 is connected to the flange 14 as illustrated.

It is clear that modifications may be made in the illustrated embodiment without departing in any way from the scope and concept of the present invention. Thus, it will be possible to eliminate the cooling conduit 20 and instead to provide a cooling jacket for the chambers 15, 15a, that is to provide them with a double wall through which cooling fluid can be circulated. This, if the outer of the two double walls is made removable, would facilitate cleaning of the interior of the cooling jacket without necessitating opening of the chambers 15, 15a as is the case if the cooling fluid is circulated through the cooling conduits 20 located in the interior of the chambers 15, 15a. On the other hand, the provision of the cooling conduit 20 or an analogous means in the interior of the chambers 15, 15a has the advantage that rotation of the flowable medium in the chambers 15, 15a—caused by the rotation of the shaft 7—is precluded and that instead the flowable medium undergoes turbulence which advantageously influences the heat exchange with the flowable medium.

It will be understood that each of the elements described above, or two or more together, may also find a useful application in other types of construction differing from the types described above.

While the invention has been illustrated and described as embodied in a device for separating foam into its liquid and gaseous phases, it is not intended to be limited to the details shown, since various modifications and structural changes may be made without departing in any way from the spirit of the present invention.

I claim:

1. A device for separating foam into its liquid and gaseous phases, comprising housing means having an interior which is to be protected against contamination from the exterior, an outer side, and an opening extending from said outer side to said interior, said housing means being adapted to contain foam which is to be separated into its respective phases; a rotatable shaft extending through said opening and including a first shaft portion in said interior and a second shaft portion outside said housing means, said shaft having an inner passage communicating with said interior for evacuation of the gaseous phase of said foam; drive means engaging said second shaft portion spaced from said outer side for rotating said shaft; wall means surrounding said second shaft portion and defining a chamber extending from said drive means to said opening; a pair of sliding ring seal means on said second shaft portion closing said chamber with reference to said opening and to said drive means; and inlet and outlet means communicating with said chamber for circulating a flowing medium through the same.

2. A device as defined in claim 1; and further comprising cooling conduit means for cooling said flowing medium circulating through said chamber.

3. A device as defined in claim 2; wherein said cooling conduit means constitutes a helix located in said chamber surrounding said second shaft portion within the same.

4. A device as defined in claim 1, wherein said sliding ring seal means comprises a pair of first annular sealing members provided on said second shaft portion and each having a first annular sealing surface, and a pair of second annular sealing members provided on said housing means and wall means, respectively, and each having a second sealing surface in sliding contact with the associated first sealing surface.

5. A device as defined in claim 1, said second shaft portion having a free end spaced from said drive means; further comprising outlet conduit means communicating with said inner passage at said free end; second wall means defining a second chamber surrounding said second shaft portion intermediate said drive means and said outlet conduit means; a pair of additional sliding ring means closing said second chamber with reference to said drive means and outlet means communicating with said second chamber for circulating a flowable medium through the same.

6. A device as defined in claim 5, wherein said outlet means of said chamber communicates with said additional inlet means of said second chamber.

7. A device as defined in claim 5, said drive means comprising a casing; and wherein said wall means and said second wall means are unitary with said casing and releasably connected to said housing and said outlet conduit means, respectively.

8. A device as defined in claim 5; and further comprising cooling conduit means associated with both of said chambers for cooling the flowable medium circulating through the same.

9. A device as defined in claim 1, said drive means comprising a drive motor and a casing having a first portion facing towards and a second portion facing away from said housing, said first portion being mounted on said shaft and said second portion being mounted on said first portion and carrying said drive motor.

10. A device as defined in claim 9, said second shaft portion having a free end remote from said housing; and said shaft further comprising a rotatable sleeve surrounding said second shaft portion and extending from the region of said free end portion to the interior of said casing, and cooperating coupling portions on said shaft and said sleeve within said casing, said drive means engaging said sleeve and transmitting motion via the same and said coupling portions to said second shaft portion.